UNITED STATES PATENT OFFICE.

ERNST HINTERLACH, OF MUNICH, GERMANY.

PROCESS OF BREWING BEER.

1,152,415. Specification of Letters Patent. Patented Sept. 7, 1915.

No Drawing. Application filed March 23, 1915. Serial No. 16,475.

*To all whom it may concern:*

Be it known that I, ERNST HINTERLACH, a citizen of the German Empire, and residing at Munich, Bavaria, German Empire, have invented a new and useful Improved Process of Brewing Beer, of which the following is a full, clear, and exact description.

It is old to brew beer containing but a small percentage of alcohol by mixing beer, ready for consumption, with unfermented beer wort and cooling and filtering the resultant liquid. The beer thus produced had to be pasteurized at once at a temperature above 55° C., without having first undergone a storage, in order to render it durable in bottles for any considerable length of time. The effect of this immediate pasteurizing process is to deteriorate certain properties of the beer rendering the product different from the ordinary kinds of beer. Storing the mixed beer did not take place, because it was thought that the addition of the unfermented beer wort to beer, which was ripe for consumption, rendered an immediate pasteurization of the mixture necessary.

Exhaustive experiments with the mixture resulted in the surprising fact, that the properties of the latter more nearly resemble those of the ordinary beer, if the mixture is not immediately pasteurized, but first stored at a low temperature (about 0° C.), then duly filtered, filled off and eventually pasteurized. For example the process may be carried out in the following three steps:—

1. *Production of the first beer (ready for consumption).*—In order to produce this beer, malt is employed the dissolving of which is just finished, but also malt substitutes such as rice, maize, etc., may be employed. Advantageously a short mash is employed, so as to retard the disintegration of the substances. After the wort has been cleared, it is boiled with hops until breaking up occurs. After removing the hops and residues the beer is cooled and removed to the fermenting cellars and fermented with a low grade fermenting yeast. After the fermentation has taken place the beer is taken to the storage cellar in as clear a state as possible where it is stored at a low temperature until it is in a fit state for consumption.

2. *Production of the second (unfermented) beer.*—Malt or malt substitutes may be employed for the production of this beer. The mashing process may take place in the usual manner. In boiling the hops, care must be taken that the taste suits that of the public. After boiling until decomposition, the beer is cleared and brought to the temperature of the beer fit for consumption as set forth under heading 1.

3. *Mixing the two beers.*—The beers manufactured as described under the headings 1 and 2 are now mixed. In the first place, the amount of alcohol of the beer fit for consumption described under heading 1 is determined and according to this result the proportions are calculated in which the two beers are to be mixed, in order to obtain a beer having the desired contents of alcohol. The mixing may take place in special receptacles but may also be effected in the vats, storage casks and tanks. The mixture is then stored at a low temperature (about 0° C.) and, after it has become ripe, filtered, drawn off and eventually pasteurized.

I claim as my invention:—

In the process of producing beer poor in alcohol, the step of holding combined beer and wort at low temperature during its refining, prior to pasteurizing said mixture.

In testimony whereof I affix my signature in the presence of two witnesses.

ERNST HINTERLACH.

Witnesses:
 FREDERICK J. SCHUSSEL,
 WASHEY FONTSPEGELBERG.

Copies of this patent may be obtained for five cents each, by addressing the "Commissioner of Patents, Washington, D. C."